United States Patent [19]

Torii et al.

[11] Patent Number: 4,712,175
[45] Date of Patent: Dec. 8, 1987

[54] DATA PROCESSING APPARATUS

[75] Inventors: Shunichi Torii, Musashino; Shigeo Nagashima, Hachioji; Koichiro Omoda, Sagamihara, all of Japan

[73] Assignee: Hitachi, Ltd., Tokyo, Japan

[21] Appl. No.: 633,981

[22] Filed: Jul. 24, 1984

[30] Foreign Application Priority Data

Jul. 27, 1983 [JP] Japan .................. 58-135816

[51] Int. Cl.⁴ ................ G06F 15/347; G06F 15/16
[52] U.S. Cl. .................... 364/200; 364/900; 364/736
[58] Field of Search ... 364/200 MS File, 900 MS File, 364/736

[56] References Cited

U.S. PATENT DOCUMENTS

| | | | |
|---|---|---|---|
| 4,128,880 | 12/1978 | Cray, Jr. ............... | 364/200 |
| 4,270,181 | 5/1981 | Tanakura et al. ....... | 364/736 |
| 4,302,818 | 11/1981 | Niemann ............... | 364/736 |
| 4,525,796 | 6/1985 | Omoda et al. .......... | 364/730 |
| 4,594,682 | 6/1986 | Drimak ................ | 364/900 |
| 4,641,275 | 2/1987 | Hatakeyama et al. ..... | 364/900 |

Primary Examiner—Gareth D. Shaw
Assistant Examiner—Christina Eakman
Attorney, Agent, or Firm—Antonelli, Terry & Wands

[57] ABSTRACT

A data processing apparatus comprises a plurality of sub-systems each including at least one arithmetic unit, a plurality of registers, a first selector for receiving vector data and selectively outputting the input data to the registers, and a second selector for receiving the vector data from the registers and selectively outputting the input data to a plurality of output lines. The data output of the arithmetic unit in each sub-system is supplied to the first selector in the same sub-system and the first selector in another sub-system, and the arithmetic unit in each sub-system receives the output data from the second selector in the same sub-system. The data output from the second selector in at least one sub-system is supplied to a main storage unit, and the data output from the main storage unit is supplied to the first selector in at least one sub-system.

9 Claims, 8 Drawing Figures

DATA PROCESSING APPARATUS

BACKGROUND OF THE INVENTION

The present invention relates to a data processing apparatus having a plurality of arithmetic units and a plurality of registers for parallelly executing register-to-register arithmetic operations by simultaneously operating different arithmetic units, and more particularly to a data processing apparatus for executing the above operations for vector data.

In a field of large scale technical calculation, a large volume of arithmetic operations for a large volume of data is required. In a high speed computer, a plurality of arithmetic units are provided and they are operated parallelly.

FIG. 1 shows a schematic configuration of a prior art vector processing apparatus. Numeral 10 denotes a main storage unit (MS), numerals 20 and 21 denote pipelined arithmetic units and numeral 50 denotes registers which can be written and read independently.

For convenience of explanation, the numbers of the registers and the arithmetic units are assumed to be 8 and 2, respectively. Numeral 60 denotes a first selector for parallelly sending out data read from the MS 10 or a vector from the arithmetic unit 20 or 21 to one of the registers 50 in a pipeline fashion one vector data element at a time. Numeral 70 denotes a second selector for parallelly sending out the vector data serially read from the respective registers 50, one vector data element at a time, to the MS 10 or the arithmetic unit 20 or 21. Any combination of the register R0–R7 and the arithmetic unit 20 or 21 or the MS 10 can be designated by a control circuit 80 in accordance with a program instruction.

Let us assume that each vector data block consists of a plurality of vector data elements each consisting of parallel sixteen bits. The circuit of FIG. 1 shows the configuration per bit of the parallel 16-bit vector data elements actually, therefore, 16 configurations of FIG. 1 should be parallelly arranged. The same is true for other drawings.

The control circuit 80 serially decodes the instructions and outputs result register numbers of registers in which the result data is stored, through lines Ri1–Ri4 which correspond to the lines 91–94, respectively, to the internal registers of the first selector 60 depending on a resource (arithmetic unit or MS) and the register required by the decoded instruction, and outputs operand register numbers from which the vector data is outputted, through lines Rj1, Rj2, Rk1, Rk2 and Rl1 which correspond to the lines 82, 84, 83, 85 and 90, respectively, to the internal registers of the second selector 70.

A timing for serially reading out the vector data from the vector registers R0–R7 and a timing for storing the result vectors serially outputted from the arithmetic units 20 and 21 to the vector registers R0–R7 are controlled by the control circuit 80.

Such a vector data processing apparatus is disclosed in U.S. application Ser. No. 453,094, now U.S. Pat. No. 4,617,625, based on Japanese patent application No. 56-210392, assigned to the assignee of the present application.

In the vector data processing apparatus of this type, the vector element data is sequentially read out from one or two vector registers designated as the operand registers by an instruction, and the data is sent to the arithmetic unit 20 or 21, and the operation result is sequentially stored in one register designated as the result register by the instruction. The content of the vector register designated by the instruction is stored in the MS 10 or the vector data in the MS 10 is transferred to the vector register designated by the instruction. Accordingly, the operations for a plurality of instructions which use different operand registers, result registers or resources (arithmetic units or MS) are executed parallelly.

When a register designated as the result register by a preceding first instruction is used as the operand register by a succeeding second instruction, the operation by the second instruction is started before the operation by the first instruction ends, that is, in the course of the arithmetic operation of the vector elements relative to the first instruction. As a result, the first and second instructions are partially and parallelly executed. This technique is called chaining. The chaining operation is disclosed in U.S. Pat. No. 4,128,880.

An operation of the apparatus of FIG. 1 is now explained taking a vector operation as an example.

$$Z=[\{(x+a)*b\}+c]*y$$

where $x$ and $y$ are variable vectors in the MS 10, $a$, $b$ and $c$ are constant vectors read from the MS 10 and stored in the registers R1, R3 and R5, and $z$ is a variable vector which is to be written into the MS 10 as an operation result.

FIG. 2 shows a diagram of a vector operation executed in parallel by the two arithmetic units 20 and 21, the MS 10 and the eight registers R0–R7.

A first instruction to transfer the vector $x$ from the MS 10 to the register R0 is executed. By the execution of this instruction, the vector data elements of the vector $x$ are serially read out from the MS 10 to a line 91. The first selector 60 responds to the signal supplied from the control circuit 80 as a result of decoding of the first instruction to connect the line 60 to the input terminal of the register R0. In this manner, the vector data elements of the vector $x$ are sequentially stored in the register R0 by the control circuit 80. In the mean time, the execution of a second instruction for addition of the vectors in the registers R0 and R1 is started. However, the register R0 requested by the second instruction is used by the first instruction to store the vector therein. Accordingly, the control circuit 80 does not immediately start the transfer of the vectors from the registers R0 and R1. When the head data element of the vector $x$ is stored in the register R0, the control circuit 80 starts the transfer of the head vector data element pair of the vectors stored in the registers R0 and R1. On the other hand, the second selector 70 responds to the signal supplied from the control circuit 80 as a result of decoding of the second instruction to connect the output terminals of the registers R0 and R1 to the lines 82 and 83, respectively. In this manner, the head vector data element pair of the vectors $x$ and $a$ is transferred to the arithmetic unit 20. In a similar manner, the remaining elements of those vectors are sequentially sent to the arithmetic unit 20. The arithmetic unit 20 executes pipeline addition for the serially inputted vector data element pairs, and serially outputs the results. The first selector 60 responds to the signal supplied from the control circuit 80 as a result of decoding of the second instruction to connect the output line 93 of the arithmetic unit 20 to the register R2 which is designated as the result register by the second instruction. The control circuit 80 serially writes into the register R2 the vector data elements of the result vector (x+a) which are serially sent from the arithmetic unit 20.

In this manner, as soon as the storing of the vector data elements of the vector x into the register R0 is started, the vector operation by the arithmetic unit 20 is executed in parallel with the storing, and the result is stored in the register R2.

In a similar manner, a third instruction which instructs multiplication of the vectors in the registers R2 and R3 is executed in parallel with the storing of the vector data elements of the vector (x+a), and a product vector (x+a)*b is stored serially by the vector data element in the register R4 designated by the third instruction.

Next, a fourth instruction which instructs addition of the vectors in the registers R4 and R5 is executed. In the vector processing apparatus of FIG. 1, only two arithmetic units are provided. Accordingly, the execution of the fourth instruction is delayed until the arithmetic unit 20 completes the execution of the addition of the vectors (x+a) by the second instruction. When the arithmetic unit 20 completes the execution of the second instruction, the fourth instruction is executed by the arithmetic unit 20 in parallel with the storing of the vector (x+a)*b in the register R4, and a sum vector (x+a)*b+c outputted by the arithmetic unit 20 is stored in the register R6 designated by the fourth instruction.

A fifth instruction to store the vector y in the register R7 is executed at an appropriate time, and the vector y is serially stored in the register R7 from the MS 10. After the fourth and fifth instructions, a sixth instruction to add the contents of the registers R6 and R7 and store the sum in the register R0 is executed. Because the data processing apparatus of FIG. 1 has only two arithmetic units, the execution of the sixth instruction is delayed until the arithmetic unit 21 completes the execution of the multiplication by the third instruction. When the arithmetic unit 21 completes the execution of the third instruction, the control circuit 80 reads out the vector data element pairs of the vector (x+a)*b+c and the vector y to the registers R0 and R7. Those vector data pairs are sent to the arithmetic unit 21 through the second selector 70 and the product is stored in the register R1 through the first selector 60. In a similar manner, the operations for other vector data pairs are carried out.

As soon as the head vector data element of the result vector from the arithmetic unit 21 is stored in the register R0, an instruction to transfer the content of the register R0 into the MS 10 is executed and the final result vector is serially stored in the MS 10.

In the execution of the instructions described above, the first and second selectors 60 and 70 receive the register numbers from the control circuit 80 to control the connection between the lines 82–85, 90 and the registers R0–R7 and the connection between the lines 91–94 and the registers R0–R7.

When the number of arithmetic units in the data processing unit is small, the execution of the succeeding instruction is delayed until the arithmetic unit used by the previous instruction becomes available. Accordingly, the chaining is not attained efficiently. Further, when the number of registers is small, some registers (e.g., R0 in the above case) must be used twice or more in the course of execution of a vector operation. While the data processing apparatus of FIG. 1 is simplified for the purpose of better understanding, it is apparent that in an actual data processing apparatus, the larger the number of arithmetic units is, the faster are a large volume of operations executed. In the actual data processing apparatus, a number of registers are required. Accordingly, a data processing apparatus having a number of arithmetic units and registers is desirable. For example, a data processing apparatus, as shown in FIG. 3, has twice as large a capacity as that of the data processing apparatus of FIG. 1, but is constructed in accordance with the concept of FIG. 1. In FIG. 3, the numbers of the arithmetic units and the registers are 4 and 16, respectively, and two output lines extend from the second selector 70 to the MS 10. Like numerals to those shown in FIG. 1 designate like elements. The second selector 70 of FIG. 3 comprises ten partial selectors for connecting the output of a selected one of the registers R0–R15 to the two input lines 90, 81 for the MS 10 and the eight input lines 82–89 for the four arithmetic units 20–23. Similarly, the first selector 60 comprises six partial distributors for connecting the output lines 91 and 92 from the MS 10 and the four output lines 93–96 from the arithmetic units 20–23 to respective ones of the registers R0–R15. The control circuit 80 sequentially decodes the instructions and outputs operand register numbers Rj1–Rj4 for designating first inputs of the arithmetic units, operand register numbers Rk1–Rk4 for designating second inputs of the arithmetic units and register numbers Rl1 and Rl2 for storing into the MS 10, to the eight partial selectors of the second selector 70, depending on the resource (arithmetic unit or MS) and the register requested by the decoded instruction. The result register numbers Ri1–Ri6 are outputted to the six partial distributors of the first selector 60.

In the data processing apparatus shown in FIG. 3, when the vector operation $Z=[\{(x+a)*b\}+c]*y$ is to be carried out, the delay of the execution of the instruction due to the small number of arithmetic units is avoided and efficient chaining is attained. Even when the result register of the preceeding instruction and the operand register of the succeeding instruction are common, the execution of the succeeding instruction may be started as soon as the first result vector element for the preceeding instruction is obtained so that the two instructions are effectively parallelly executed.

In FIG. 3, the first and second selectors 60 and 70 can connect any register and any resource. However, such a selector is of large scale and has a limitation on the arrangement of the circuit components and a limitation on the operation speed due to the delay time in the selector.

For example, in the second selector 70, it is desirable, for reducing a signal propagation time on the signal line, that the readout data lines 51 of the registers 50 (that is, the input signal lines to the second selector 70), the data lines 90 and 81 to the MS 10 and the data lines 82–89 to the arithmetic units 20–23 are short and concentrated. In order to meet the above requirements, it is necessary that the MS 10 and the arithmetic units 20–23 are located in the vicinity of the registers 50. However, when the number of the arithmetic units and the number of the registers R0–R15 are increased, such a physical arrangement is very difficult to attain. As a result, the signal propagation time on the signal line cannot be sufficiently reduced. The same is true for the relation between the first selector 60 and the output lines 93-96 of the arithmetic units 20-23.

It is considered that the circuit scale of the selector 60 or 70 is proportional to a product of the number of inputs and the number of outputs. For example, for the selector, the circuit scale of a one-out-of-n selector is proportional to the number n of inputs and an n-input m-output selector can be attained by m n-input selectors. For the distributor, the circuit scale of an m-output distributor is proportional to the number m of outputs and an n-input m-output distributor can be attained by n partial distributors. Accordingly, the first and second selectors 60 and 70 have problems in that the circuit scale increases as the numbers of registers and arithmetic units increase.

For this reason, the signal propagation time in the selectors 60 and 70 cannot but increase as the numbers of registers and arithmetic units increase.

SUMMARY OF THE INVENTION

It is an object tne present invention to provide a data processing apparatus which prevents enlargement of the circuit scale of a selector as the numbers of arithmetic units and registers increase and allows physical distribution of the selector.

The present invention is characterized by a first selector having registers divided into a plurality of groups for selectively connecting an output of a portion of resources for each group to an input of a selected register in each group, and a second selector for selectively connecting an output of a selected register in each group to an input of a portion of the resources for each group.

BRIEF DESCRIPTION OF THE DRAWINGS

The present invention will be apparent from the following detailed description taken in conjunction with the accompanying drawings, in which.

DETAILED DESCRIPTION OF THE PREFERRED EMBODIMENT

Figure 4:
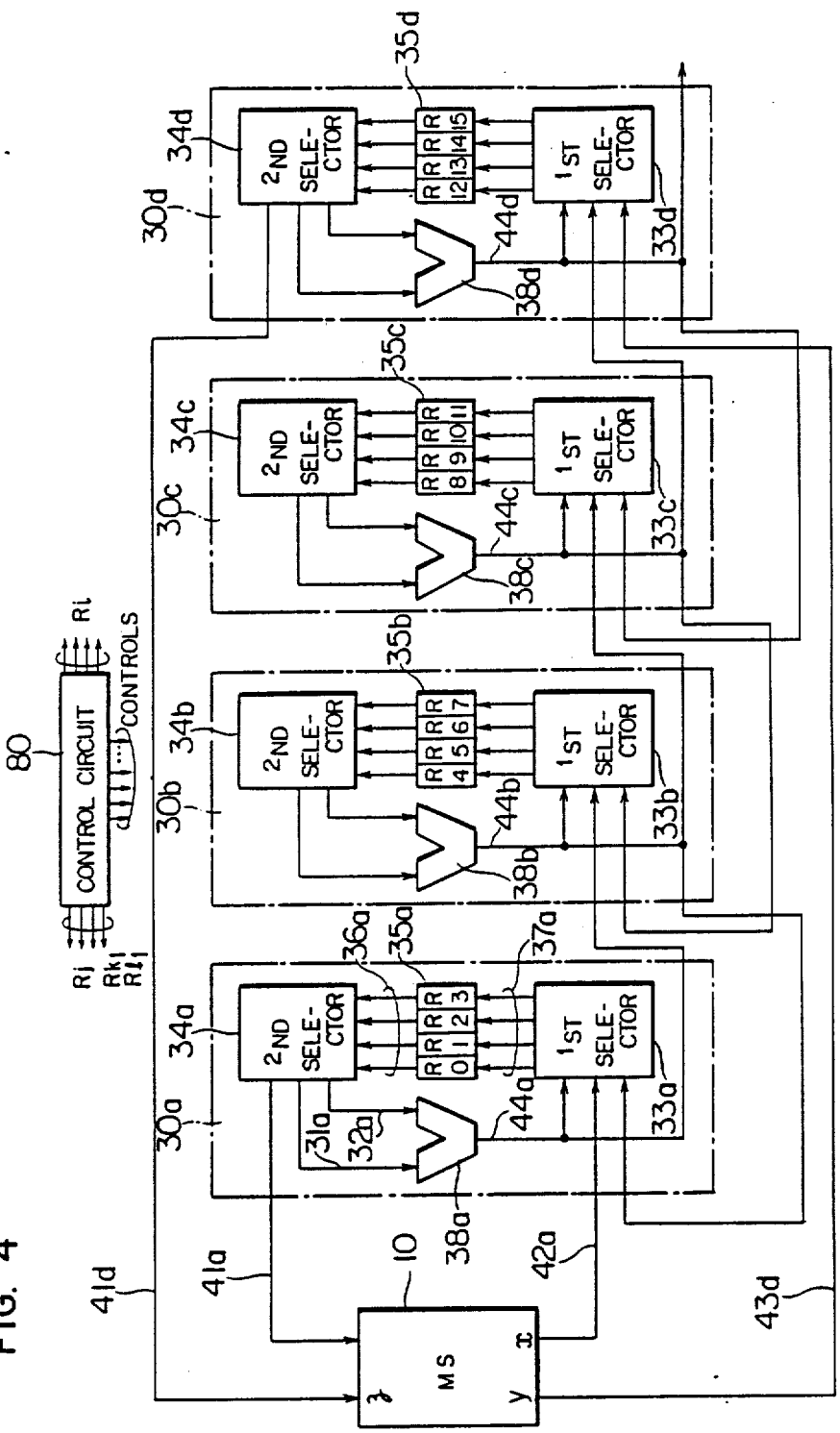
FIG. 4 shows a configuration of one embodiment of a vector operation unit of the present invention.

FIG. 4 shows a first embodiment of the present invention. In the present embodiment, vector registers R0-R15 are divided into four groups 35a-35d to which the registers R0-R3, R4-R7, R8-R11 and R12-R15 are allotted. First and second selectors 33a, 34a; 33b, 34b; 33c, 34c; and 33d, 34d are provided for the respective groups. The outputs of the register group 35a are connected to two inputs of the MS 10 or an arithmetic unit 38a by the second selector 34a through lines 41a, 31a and 32a. Thus, the second selector 34a comprises three partial selectors (see FIG. 6) for connecting the signal lines 41a, 31a and 32a to respective ones of the registers R0-R3. Each of the partial selectors responds to one of the register identification signals Rj, Rk and Rl supplied from a control circuit 80. Similarly, the first selector 33a selectively connects an output line 42a of the MS 10, an output line 44a of the arithmetic unit 38a allotted to the register group 53a and an output line 44b of the arithmetic unit 38b allotted to the register group 35b to the inputs of the registers in the register group 35a. Thus, the first selector 33a comprises three partial distributors (see FIG. 5) provided for the signal lines 42a, 44a and 44b.

Thus, one sub-system 30a is constructed by the register group 35a, the first and second selectors 33a and 34a and the arithmetic unit 38a. Similarly, similar subsystems 30b-30d are constructed for the register groups 35b-35d. The sub-system 30d differs from the sub-system 30a only in that the output line 44c of the arithmetic unit 38c is connected to the first selector 33d, and the second selectors 34b and 34c of the sub-systems 30b and 30c differ from the other second selectors 34a and 34d in that the former selectors are not connected to the MS 10. The output lines 44a and 44c of the arithmetic units 38a and 38c are connected to the first selector 33b but the output of the MS 10 is not connected thereto, and the output lines 44b and 44d of the arithmetic units 38b and 38d are connected to the first selector 34c but the output of the MS 10 is not connected thereto, unlike the first selectors 34a and 34d.

The present embodiment is characterized in that the operation between the vector data in a selected register in the register group in each sub-system is carried out by the arithmetic unit allotted to each group, and a result vector is stored in a selected register in the same group and it may also be stored in the register group in another sub-system.

A portion of the resources and a portion of the registers are allotted to each of the second selectors 34a-34d, and a portion of the resources and a portion of the registers are allotted to each of the first selectors 33a-33d. The number of the arithmetic units directly connected to the second selectors 34a-34d is smaller than the number of the arithmetic units directly connected to the selectors 33a-33d. Usually, the arithmetic unit requires a plurality of inputs and one output. Accordingly, the fact that the number of the arithmetic units connected to the first selectors 33a-33d is larger than the number of the arithmetic units connected to the second selectors 34a-34d does not significantly lead to the complexity of the first selector. For example, in FIG. 3, the number of the input lines of the first selector 33b is three which is equal to the total of the outputs of the three arithmetic units 38a-38c. On the other hand, the number of output lines of the second selector 34b is two which is equal to the number of input lines of the arithemtic unit 38b.

A further characteristic feature in FIG. 4 is that the output of each arithmetic unit is simultaneously supplied to a plurality of first selectors. For example, the output line 44b of the arithmetic unit 38b is connected to the three selectors 33a-33c. As a result, the output vector of the arithmetic unit 38b can be stored not only in one of the vector registers R4-R7 through the selector 33b but also in another register, for example, one of the registers R8-R11 or R0-R3. If the result vector of the arithmetic unit 38b is stored in the register R0, a further operation to the result vector can be executed by the arithmetic unit 38a by sending the result vector from the register R0 to the arithmetic unit 38a.

In FIG. 4, if an operation by the arithmetic unit 38b is to be carried out for the vector in one register, for example, the register R1, the content of the register R1 is sent to the arithmetic unit 38a through the second selector 34a, and the arithmetic unit 38a does not carry out any operation on this vector and sends it to the register R4, for example, through the first selector 33b. The vector in the register R4 is then read out and operated in the arithmetic unit 38b. In the present embodiment, therefore, a wasteful processing of merely passing a vector through one arithmetic unit for operating it in another arithmetic unit is required because the selector is not constructed to connect any vector register to any selector. However, such wasteful processing can be reduced by constructing the system such that each of the arithmetic units 38a-38d can carry out all types of operations required by the system. It may also be resolved by allotting the registers to the instructions in compiling a program such that the wasteful transfer is minimized.

A further feature in FIG. 4 is that the numbers of output lines of the first selectors 33a-33d are equal because the numbers of registers in the respective groups are equal, and the numbers of input lines of the first selectors 33a-33d are equal because the outputs of three resources are allotted to each of the first selectors 33a-33d. The output of the MS 10 is supplied to the first selectors 33a and 33d but the numbers of outputs of the arithmetic units supplied to the first selectors 33a and 33d are two, respectively. Accordingly, the numbers of input lines of the first selectors 33a-33d are equal. This renders the identical configuration of those circuit easier.

The numbers of output lines of the second selectors 34a and 34d are three, respectively, while the numbers of output lines of the second selectors 34b and 34c are two, respectively, because the MS 10 is connected only to the second selectors 34a and 34d. If the MS 10 has two additional data input terminals, it is possible to construct the second selectors 34b and 34c such that the outputs of the second selectors 34b and 34c are connected to the MS 10. In this case, the numbers of input lines and the numbers of output lines of the second selectors 34a-34d are equal, respectively.

The control circuit 80 output the register numbers to be selected, to the second selectors 34a-34d. The register numbers are provided one for each of the output lines of the respective selectors. The control circuit 80 also outputs register numbers for selection to the first selectors 33a-33d. When the register numbers are supplied to the second selectors 34a-34d through the signal lines provided one for each of those selectors, the register numbers sent out by the control circuit 80 may consist of only numbers which permit identification of one of four registers in each group (that is, two low order bits of the register number). For example, instead of the numbers 4-7 of the registers R4-R7 for the second selector 34b, the numbers 0-3 are supplied to the second selector 34b. The same is true for the register numbers supplied to the first selectors 33a-33d.

Figure 5:
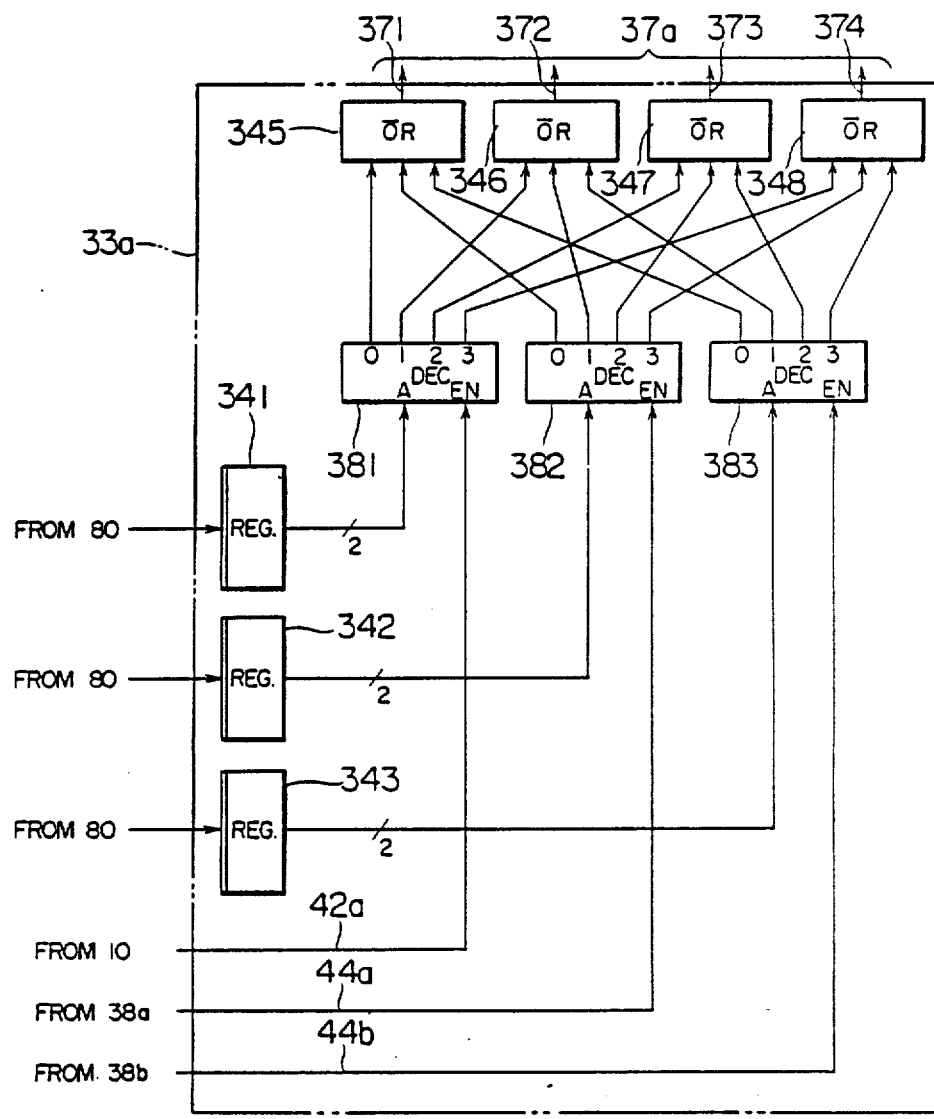
FIG. 5 shows a first selector used in the embodiment of FIG. 4.

FIG. 5 shows a detailed embodiment of the first selector 33a. The vector data from the MS 10 is supplied to a four-output decoder (partial distributor) 381 in a pipeline fashion, one vector data element at a time, through a data line 42a. In decoders 381, 382 and 383, when an EN input pin is "1", one of output pins (0, 1, 2, 3) designated by two-bit A input pin is "1". When the EN input pin is "0", all four output pins are "0". This decoder may be considered as a partial distributor which distributes the content at the EN input pin to one of four output pins in accordance with the designation by the A input pin. A register 341 stores a destination of distribution of the input 42a received from the control circuit 80, that is, two low order bits of the write register number. Thus, the elements of the vector data are supplied to an input line 371 of the register R0 through the decoder 381 and an OR gate 345 in accordance with the designation of the register 341. The decoder 382 and the register 342 correspond to the data input line 44a, and the decoder 383 and the register 343 correspond to the data input line 44b. The OR gates 346, 347 and 348 and the outputs thereof 372, 373 and 374 correspond to the registers R1, R2 and R3, respectively. The m-input n-output selector can be realized by m log 2 n-bit registers, m n-output decoders and n m-input OR gates. The OR gate may be omitted depending on a wiring logic.

Figure 6:
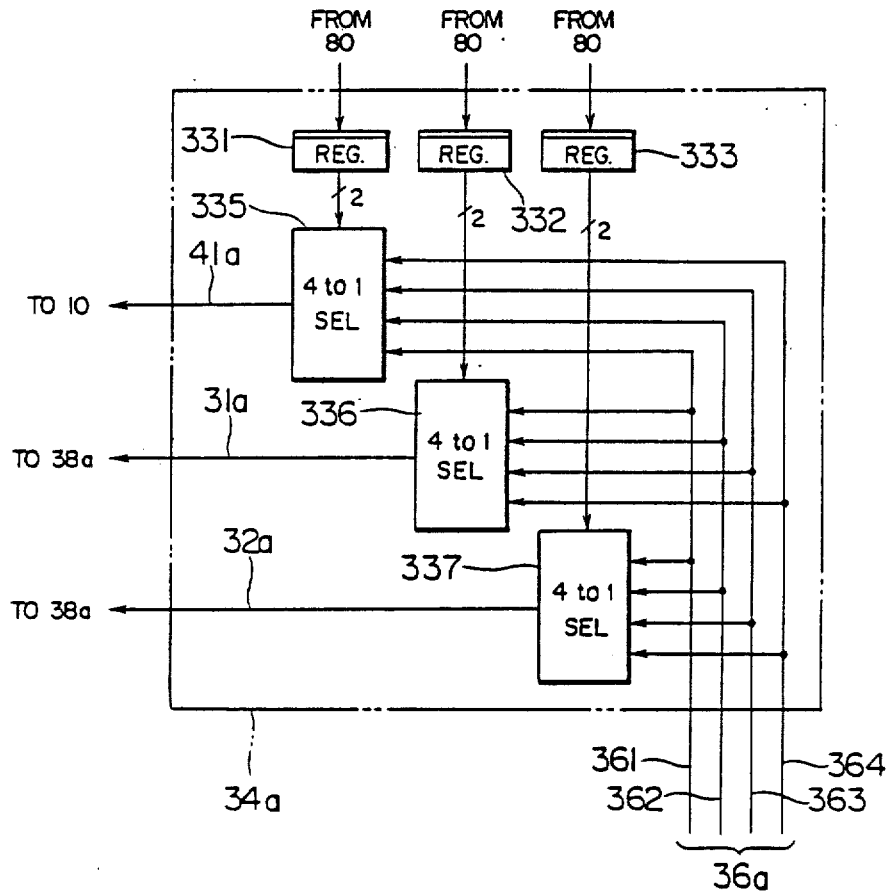
FIG. 6 shows a second selector used in the embodiment of FIG. 4.

FIG. 6 shows a detailed embodiment of the four-input three-output type second selector 34a. It is constructed by three four-input selectors. Data lines 361, 362, 363 and 364 in a data line group 36a are used to transfer data read from the registers R0, R1, R2 and R3, respectively. The register 331 and the selector 335 correspond to the data transferred to the MS 10 through the data line 41a, the register 332 and the selector 336 correspond to the data to the left input terminal of the arithmetic unit 38a through the data line 31a, and the register 333 and the selector 337 correspond to the data to the right input terminal of the arithmetic unit 38a through the data line 32a. The data to the registers 331, 332 and 333 are supplied from the control circuit 80.

The m-input n-output second selector of FIG. 6 can also be constructed by n log 2 m-bit registers and n m-input selectors. In FIG. 6, the registers are provided one for each output, unlike the registers in FIG. 5.

The control circuit 80 in FIG. 5 sends out the signals CONTROLS for controlling the write and the read of the registers R0-R15 to the vector registers.

The embodiment of FIG. 4 is constructed by four sub-systems 30a-30d and the circuit configurations of those sub-systems may be very similar to each other. When the arithmetic units 38a-38d are general purpose arithmetic units capable of carrying out various operations, the sub-systems may be constructed by similar or identical circuit configuration including the arithmetic unit and the manufacture and the expansion of the sub-systems are facilitated.

Figure 1:
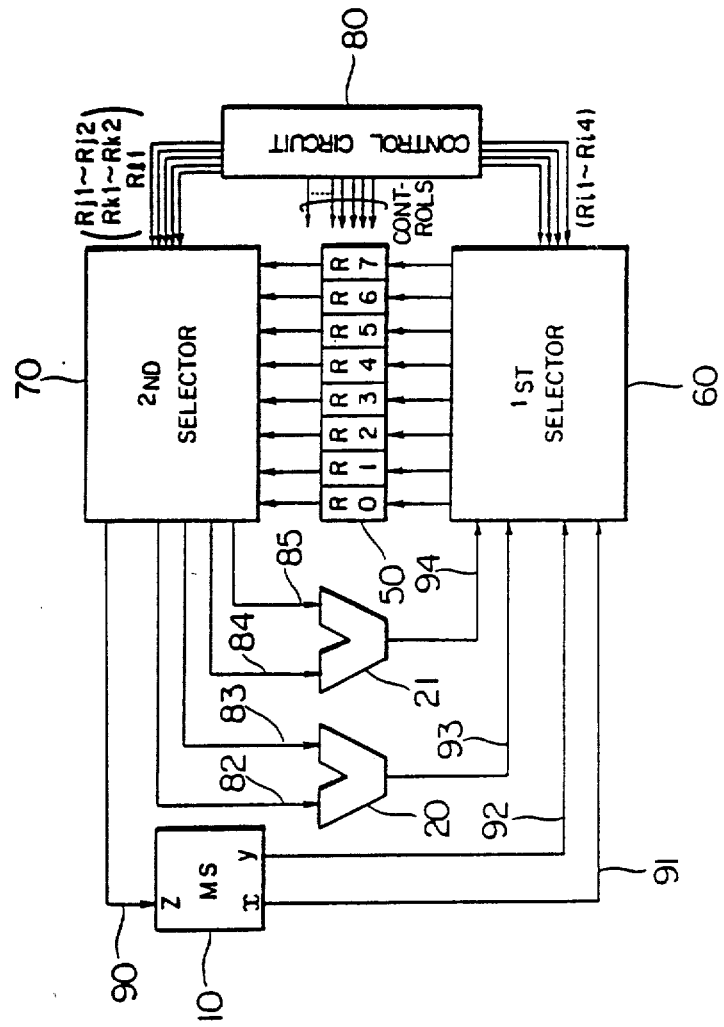
FIG. 1 shows a schematic configuration of a prior art vector operation unit.
Figure 2:
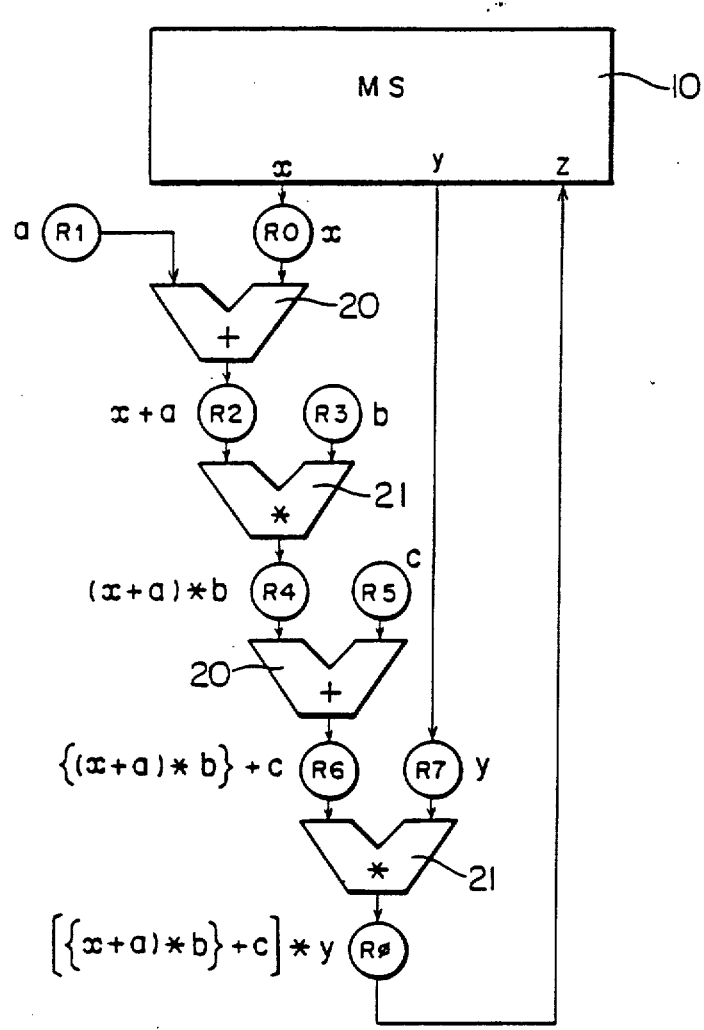
FIG. 2 is a diagram of a vector operation by the vector operation unit of FIG. 1.
Figure 7:
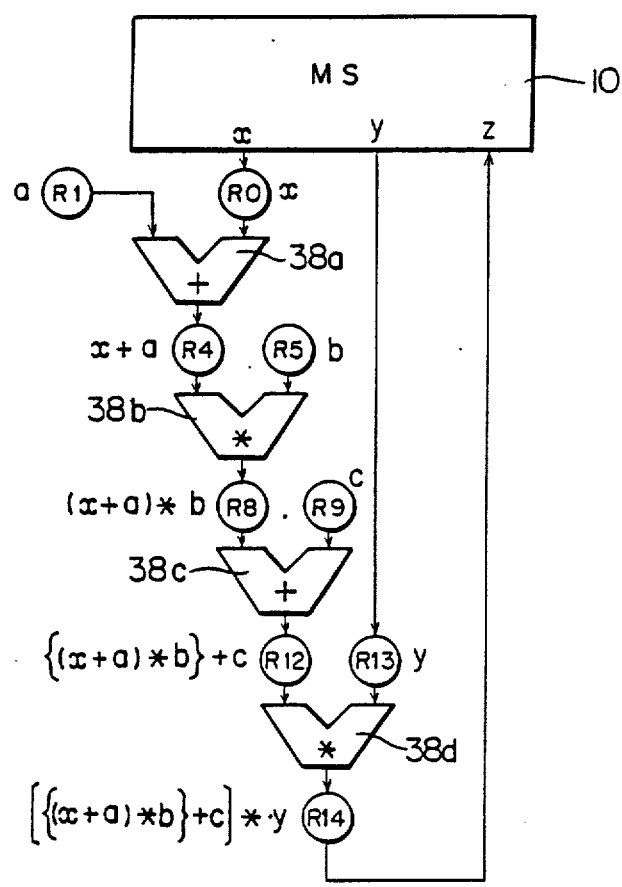
FIG. 7 illustrates a vector operation by the vector operation unit of FIG. 4.

Referring to FIG. 7, the operation of the embodiment of FIG. 4 for the vector operation $Z=[\{(x+a)*b\}+c]*y$, which is more efficient than the operation of the apparatus of FIG. 1, is explained. The vector variable x stored in the MS 10 is supplied to the selector 33a of the sub-system 30a in a pipeline fashion, one vector data element at a time, through the data line 42a. The vector data are transferred in the pipeline fashion, one data element at a time. The vector data elements of the vector variable x are sequentially written into the register R0 of FIG. 4. The content written into the register R0 is also sent to the arithmetic unit 38a through the selector 34a and the data line 31a, in parallel with the writing to the register R0. The elements of the vector constant a previously stored in the register R1 are also sent to the arithmetic unit 38a through the selector 34a and the data line 32a, in synchronism with the content of the register R0.

The arithmetic unit 38a of FIG. 4 carries out the addition of the vector variable x and the vector constant a in the pipeline fashion one element at a time, and a vector intermediate result (x+a) is written into the register R4 in the register group 35b through the data line 45a and the selector 33b.

In a similar manner, the arithemtic unit 38b carries out multiplication of the vector intermediate result (x+a) in the register R4 and the vector constant b in the register R5, in parallel with the store into the register R4, and the vector intermediate result (x+a)*b is stored in the register R8.

The arithmetic unit 38c carries out addition of the vector intermediate result (x+a)*b in the register R8 and the vector constant c in the register R9, in parallel with the store into the register R8, and stores the vector intermediate result {(x+a)*b}+c in the register R12.

The vector variable y in the MS 10 is written into the register R13 through the data line 43d and the first selector 33d. The arithmetic unit 38d carries out multiplication of the vector intermediate result {(x+a)*b}+c in the register R12 and the vector variable y in the register R13 and writes a vector final result into the register R14. It is also written into the MS 10 as the variable z from the register R14 through the selector 34d and the data line 41d, in parallel with the writing into the register R14.

Figure 3:
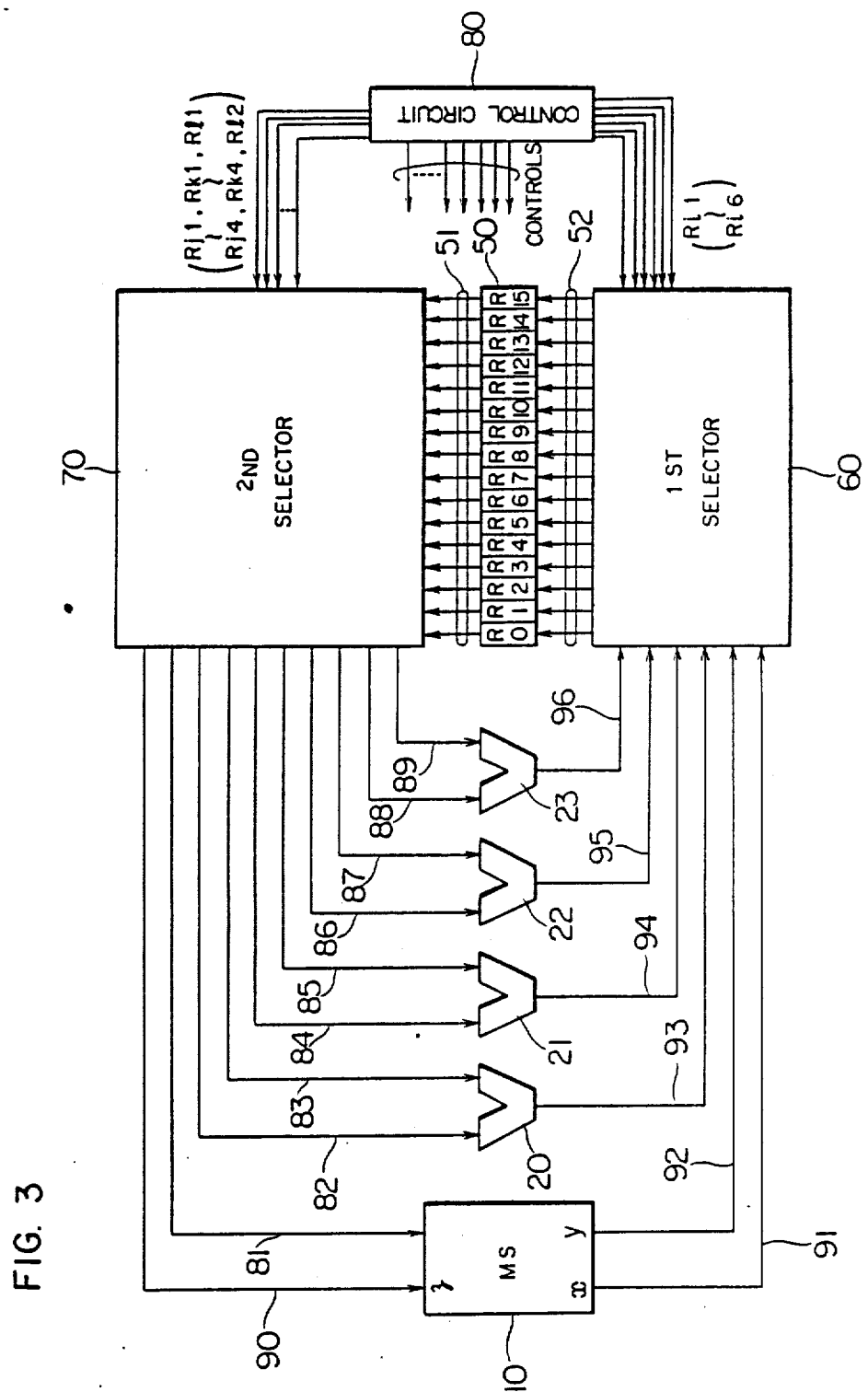
FIG. 3 is a schematic configuration of a vector operation unit possibly used when a large volume of data are to be operated.

In the apparatus of FIG. 4 which includes four sub-systems and the MS, the chaining type parallel operation by the arithmetic unit is attained as is done by the apparatus of FIG. 3.

Figure 8:
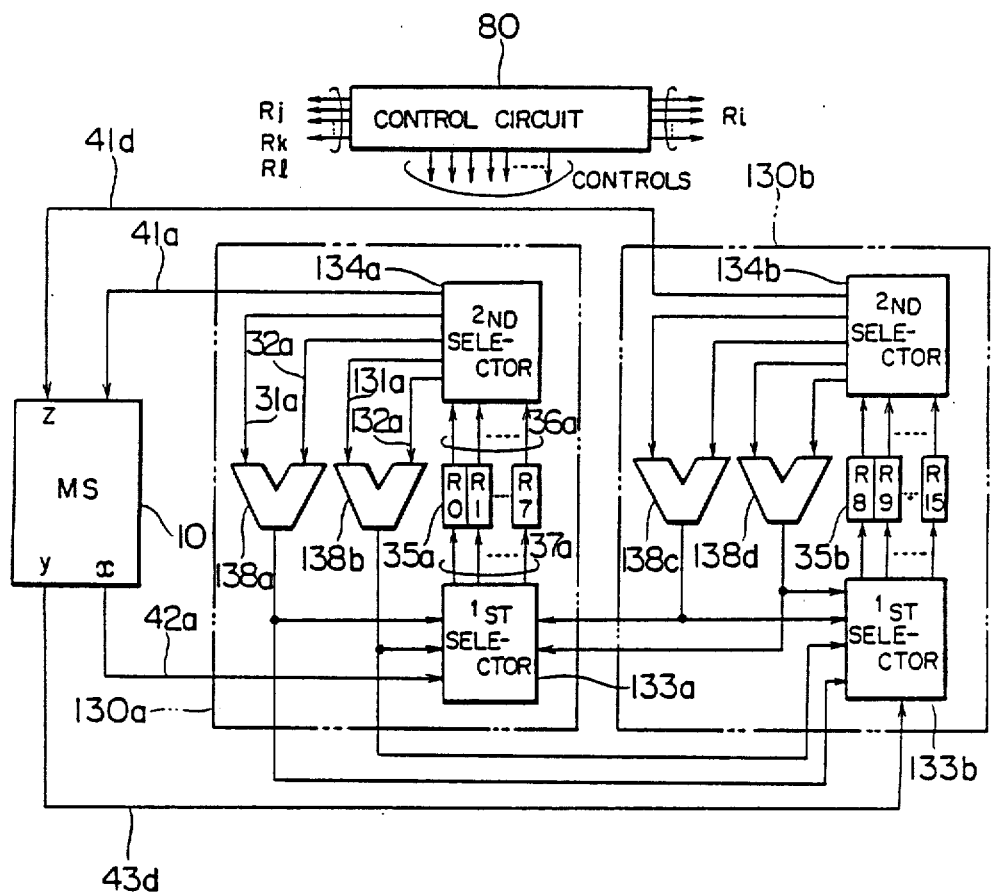
FIG. 8 shows a configuration of another embodiment of the vector operation unit of the present invention.

FIG. 8 shows a second embodiment of the present invention which includes two sub-systems 130a and 130b. Each of selectors 133a, 133b, 134a and 134b is connected to eight vector registers R0–R7 or R8–R15. The outputs of the second selectors 134a and 134b are connected to arithmetic units 138a and 138b and an MS 10, and arithmetic units 138c and 138d and the MS 10, respectively. The inputs of the first selectors 133a and 133b are connected to all of the arithmetic units 138a, 138b, 138c and 138d and the MS 10. The outputs of the arithmetic units 138a, 138b, 138c and 138d can be connected to all registers through the first selector 133a or 133b. The other portion of the circuit are essentially identical to FIG. 4.

In the present embodiment, the numbers of the input lines and the numbers of the output lines of the first and second selectors 134a and 134b are equal, respectively. The same is true for the first selectors 133a and 133b. In the embodiment of FIG. 8 which uses two sub-systems and the MS, the chaining type parallel operation of the arithmetic unit is attained as is done in the apparatus of FIG. 3.

In the embodiments of FIGS. 4 and 8, one sub-system comprises one or two arithmetic units and four vector registers, although any number of arithmetic units and vector registers may be combined.

In FIG. 4, the outputs 41a and 41d of the second selectors 34a and 34d may be omitted. Namely, instead of the lines 41a and 41d, the output line 44a of the arithmetic unit 38a and the output line 44d of the arithmetic unit 38d are used as the inputs to the MS 10. To this end, the control circuit 80 must be modified to write the outputs of the arithmetic operations 38a and 38d directly to the MS 10.

In the above embodiments, the present invention which uses the vector registers and the pipeline arithmetic units is applied to the vector operation unit, although the present invention is not limited to the vector operation unit. For example, the present invention can be applied to a scalar operation such as $x=(a*b)+(c*d)+(e*f)+(g*h)$. To this end, the registers R0–R15 must be scalar registers. The arithmetic units 38a–38d may be non-pipeline arithmetic units. As a result, the multiplications for the four terms in the above formula can be parallelly carried out.

In the above embodiments, the control circuit 80 supplies the register numbers for each resource to the first and second selectors. Alternatively, the first selector may be modified such that the resource number to be connected to an external vector register is stored in the register of the selector so that the resource numbers are primarily stored. Similarly, the second selector may be modified such that the resource number to be connected to the external vector register is stored in the register of the selector so that the resource number is primarily stored.

The advantages of the present invention will now be described. As shown in FIG. 6, the m-input n-output second selector can be constructed by n m-input selectors. The scale of the selector should be measured by the number of gates, but for the easiness of description, a logical scale per bit of data line is considered by using, as a comparison reference, Texas Instruments 74 Series TTL ICs. Let us assume that a 16-input selector uses one model 74150 24-pin dual-in-line (DIP) packaged IC which occupies two IC areas (one IC area being a standard area for a 16-pin DIP IC), an 8-input selector and a 6-input selector each uses one model 74151 16-pin DIP IC which occupies one IC area, and a 4-input selector and a 3-input selector each uses one half of model 74153 16-pin DIP IC which occupies one IC area.

In the 16-input 10-output second selector 70 of FIG. 3, ten 16-input selectors are required and $2\times 10=20$ IC areas per bit are occupied. In the embodiment of the present invention shown in FIG. 4, the 4-input 3-output second selectors 34a–34d require $3\times 4$ 4-input selectors and $\frac{1}{2}\times 3\times 4=6$ IC areas per bit are occupied.

Accordingly, in the embodiment of FIG. 4, the IC areas per bit required for the selector is 6 IC areas, which are 70% reduction from the 20 IC areas required by the prior art selector.

Similar IC area reduction is attained for the first selector 60. Considering the areas for only the decode IC, the first selector 60 uses six 16-output decoders (model 74154 24-pin DIP ICs each occupying 2 IC areas), and occupies 12 IC areas. On the other hand, the first selector 33a of FIG. 4 uses three 4-output decoders (each being one half of model 74155 and occupying ½ IC area). Thus, the first selectors 33a–33d use 12 ICs in total and occupy 6 IC areas.

The selectors 60 and 70 in FIG. 3, which were difficult to physically disperse, are dispersed in the embodiment of the present invention shown in FIG. 4 into the selectors 33a–33d and 34a–34d. Accordingly, the limitation on the physical arrangement is significantly relieved in the present invention in comparison with the arrangement of FIG. 3.

The sub-systems 34a–34d may be perfectly identical. In FIG. 4, the number of sub-systems may be changed without changing the selectors 33a–33d and 34a–34d. Thus, the sub-systems can be readily expanded.

What is claimed is:
1. A vector data processing data processing apparatus for processing vector data including a plurality of data elements comprising more than two sub-systems each including:

(a) at least one operation unit for performing an arithmetical or logical operation on two input vector data and for outputting result vector data of said operation;

(b) a plurality of vector registers each for holding vector data and each being capable of performing reading and writing operation concurrently;

(c) a first selector connected to input terminals of said vector registers only in the same subsystem and connected with the operation unit in the same subsystem and an operation unit in a plurality, but less than all, of the different subsystem so as to receive vector data therefrom and for selectively outputting the received vector data to one vector register only in the same subsystem; and (d) a second selector connected to output terminals of said vector registers only in the same subsystem and to a pair of input terminals of said operation unit only in the same subsystem for receiving a pair of vector data from a pair of selected vector registers in said vector registers only in the same subsystem and for outputting the received pair of vector data to said operation unit only in the same subsystem; and control means connected to said plurality of subsystems and responsive to program instructions for controlling operations of said first selectors and said second selectors in said plurality of subsystems and for controlling read and write operations of said vector registers in said plurality of subsystems, said control means including means for controlling said second selector included in a first one of said plurality of subsystems which includes a first vector register register designated by one program instruction as a vector register to provide vector data held thereby so that the held vector data is transferred to said operation unit included in said first subsystem, and for controlling said first selector included in a second one of said plurality of subsystems which includes a second vector register designaed by said one program instruction as a vector register to receive vector data, so that vector data provided by said operation unit included in said first subsystem is transferred to said vector register, and said control means including means for controlling a write operation and a read operation to one of said vector registers in said plurality of subsystems so that vector data written into the one vector register is read out concurrently with the write operation thereof, when the one vector register is designated by a preceding program instruction as a vector register to receive vector data and is designated by a succeeding program instruction as a vector register to provide vector data held thereby.

2. A data processing apparatus according to claim 1 further comprising data storage means,
wherein only a part of said second selectors selectively supplies the output of a selected register in the corresponding sub-system to said data storage means, and only a part of said first selectors selectively supplies the output from said data storage means to a selected register in the corresponding sub-system.

3. A data processing apparatus according to claim 1 wherein the number of vector registers in each of said sub-systems are equal and the number of output signal lines in each of said second selectors are equal.

4. A data processing apparatus according to claim 2 wherein the number of vector registers in each of said sub-systems are equal and the number of output signal lines in each of said second selectors are equal.

5. A data processing apparatus according to claim 1 wherein the number of vector registers in each of said sub-systems are equal and the number of input signal lines in each of said first selectors are equal.

6. A data processing apparatus according to claim 2 wherein the number of vector registers in each of said sub-systems are equal and the number of input signal lines in each of said first selectors are equal.

7. A data processing apparatus to claim 3 wherein the number of input signal lines signal lines in each of said first selectors are equal.

8. A data processing apparatus according to claim 4 wherein the number of input signal lines in each of said first selectors are equal.

9. A vector data processing apparatus for processing vector data including a plurality of data elements, comprising a main storage unit;

a pair of sub-systems; and control means connected to said sub-systems for controlling operations of said subsystems;

each of said sub-systems including:

at least one arithmetic unit for performing an arithmetical or logical operation on two input vector data and for outputting result vector data of said operation;

a plurality of vector registers each for holding vector data and each being capable of performing reading and writing operations concurrently;

a first selector connected to input terminals of said vector registers only in the same subsystem and connected to receive vector data from one of said arithmetic units in said subsystems and said main storage unit for selectively outputting the received vector data to one of said vector registers in only the same subsystem; and a second selector connected to output terminals of said vector registers only in the same subsystem and to a pair of input terminals of said arithmetic unit in only the same subsystem for receiving one or a pair of vector data from one or a pair of selected vector registers in said vector registers only in the same subsystem and for outputting the received one or a pair of vector data to said arithmetic unit only in the same subsystem or to said main storage unit;

said control means being connected to said subsystems and responsive to program instructions for controlling operations of said first selectors and said second selectors in said subsystems and for controlling read and write operations of said vector registers in said subsystems, said control means including means for controlling said second selector included in a first one of said subsystems which includes a first vector register designated by one of the program instructions as a vector register to provide vector data held thereby, so that the held vector data is transferred to said arithmetic unit included in said first one of said subsystem or to said main storage unit, means for controlling said first selector included in a second one of said subsystems, which includes a second vector register designated by said one of said program instructions or by another one of said program instructions as a vector register to receive vector data, so that vector data provided from said arithmetic unit in said first one of said subsystems or from said main storage unit is transferred to said second vector register, and means for controlling a write operation and a read operation to one of said vector registers in said subsystems so that vector data written into the one vector register is read out concurrently with operation thereof, when the one vector register is designated by a preceding program instruction as a vector register to receive vector data and is designated by a succeeding program instruction as a vector register to provide vector data held thereby.

* * * * *